United States Patent
McLemore et al.

(10) Patent No.: US 11,854,411 B2
(45) Date of Patent: Dec. 26, 2023

(54) COORDINATING DRONE FLIGHTS IN AN OPERATING WIND FARM

(71) Applicant: Florida Power & Light Company, Juno Beach, FL (US)

(72) Inventors: Christopher H. McLemore, Jupiter, FL (US); Eric D. Schwartz, Juno Beach, FL (US); Steven J. Shelp, Uniondale, NJ (US); Travis B. Pedriani, Jermyn, PA (US)

(73) Assignee: Florida Power & Light Company, Juno Beach, FL (US)

( * ) Notice: Subject to any disclaimer, the term of this patent is extended or adjusted under 35 U.S.C. 154(b) by 362 days.

(21) Appl. No.: 17/131,277

(22) Filed: Dec. 22, 2020

(65) Prior Publication Data
US 2022/0198944 A1     Jun. 23, 2022

(51) Int. Cl.
*G08G 5/00* (2006.01)
*F03D 7/04* (2006.01)
(Continued)

(52) U.S. Cl.
CPC ......... *G08G 5/0043* (2013.01); *B64C 39/024* (2013.01); *F03D 7/048* (2013.01);
(Continued)

(58) Field of Classification Search
CPC .. G08G 5/0043; G08G 5/0013; B64C 39/024; B64U 2101/20; B64U 2101/60;
(Continued)

(56) References Cited

U.S. PATENT DOCUMENTS

| 9,562,870 B2 | 2/2017 | Bouteyre et al. |
| 10,054,110 B2 | 8/2018 | Zell |

(Continued)

FOREIGN PATENT DOCUMENTS

| CN | 210761314 U * | 6/2020 |
| EP | 2565449 | 6/2015 |

(Continued)

OTHER PUBLICATIONS

L. Wang and Z. Zhang, "Automatic Detection of Wind Turbine Blade Surface Cracks Based on UAV-Taken Images," in IEEE Transactions on Industrial Electronics, vol. 64, No. 9, pp. 7293-7303, Sep. 2017, doi: 10.1109/TIE.2017.2682037. 2017.

(Continued)

*Primary Examiner* — Ig T An
*Assistant Examiner* — Christine Nguyen Huynh
(74) *Attorney, Agent, or Firm* — Fleit Intellectual Property Law; Jeffrey N. Giunta (57) ABSTRACT

Systems and methods coordinate drone flights in an operating windfarm. A drone flight path that is removed from any location where the drone is conducting observations of a wind turbine and that extends through at least part of a windfarm to a destination location is determined. A respective wake pattern along at least one portion of the drone fight path is determined based on respective operating parameters for each of at least one wind turbine in the windfarm. Flight time commands to adjust at least one respective operating parameter of the respective wind turbine to reduce the effect of the respective wake pattern at a point ahead of the drone on the drone flight path are sent by a windfarm controller controlling the at least one wind turbine.

20 Claims, 5 Drawing Sheets

(51) Int. Cl.
  *B64C 39/02* (2023.01)
  *B64U 101/20* (2023.01)
  *B64U 101/60* (2023.01)

(52) U.S. Cl.
  CPC ....... *G08G 5/0013* (2013.01); *B64U 2101/20* (2023.01); *B64U 2101/60* (2023.01); *B64U 2201/10* (2023.01); *B64U 2201/20* (2023.01); *F05B 2270/80* (2013.01)

(58) Field of Classification Search
  CPC ............ B64U 2201/10; B64U 2201/20; B64U 2101/00; F03D 7/048; F05B 2270/80; F05B 2270/204
  See application file for complete search history.

(56) References Cited

U.S. PATENT DOCUMENTS

| | | | |
|---|---|---|---|
| 10,401,414 | B2 | 9/2019 | Matsushita et al. |
| 11,674,500 | B2 * | 6/2023 | Grunnet ................ F03D 7/0292 290/44 |
| 2012/0300059 | A1 | 11/2012 | Stege |
| 2015/0308416 | A1 * | 10/2015 | Ambekar ................ F03D 7/045 700/287 |
| 2018/0003161 | A1 | 1/2018 | Michini et al. |
| 2018/0149138 | A1 | 5/2018 | Thiercelin et al. |
| 2018/0273173 | A1 | 9/2018 | Moura |
| 2019/0170123 | A1 | 6/2019 | Mertens et al. |
| 2019/0178230 | A1 | 6/2019 | Sulzer et al. |
| 2020/0018291 | A1 * | 1/2020 | Rosen ..................... F03D 17/00 |
| 2020/0057002 | A1 | 2/2020 | Jung |
| 2020/0109698 | A1 | 4/2020 | Pedersen et al. |
| 2020/0116128 | A1 | 4/2020 | Pedersen et al. |
| 2020/0158091 | A1 | 5/2020 | Sen et al. |
| 2020/0166938 | A1 | 5/2020 | Hafenrichter et al. |
| 2021/0254604 | A1 * | 8/2021 | Schomacker ............ B64D 1/08 |

FOREIGN PATENT DOCUMENTS

| | | | |
|---|---|---|---|
| EP | 3287367 | 2/2018 | |
| EP | 3454157 | 3/2019 | |
| WO | WO-2018007012 A1 * | 1/2018 | ........... F03D 7/0204 |
| WO | 2019155234 | 8/2019 | |
| WO | 2019158171 | 8/2019 | |
| WO | 2020001714 | 1/2020 | |
| WO | 2020043555 | 3/2020 | |

OTHER PUBLICATIONS

M. Stokkeland, K. Klausen and T. A. Johansen, "Autonomous visual navigation of Unmanned Aerial Vehicle for wind turbine inspection," 2015 International Conference on Unmanned Aircraft Systems (ICUAS), 2015, pp. 998-1007, doi: 10.1109/ICUAS.2015.7152389. 2015.

B. E. Schäfer, D. Picchi, T. Engelhardt and D. Abel, "Multicopter unmanned aerial vehicle for automated inspection of wind turbines," 2016 24th Mediterranean Conference on Control and Automation (MED), 2016, pp. 244-249, doi: 10.1109/MED.2016.7536055. 2016.

Hoglund, Sondre. Autonomous inspection of wind turbines and buildings using an UAV. MS thesis. Institutt for teknisk kybernetikk, 2014. 2014.

* cited by examiner

COORDINATING DRONE FLIGHTS IN AN OPERATING WIND FARM

FIELD OF THE DISCLOSURE

The present disclosure generally relates to control systems for unmanned arial drones and wind turbine farms, and more particularly to integrated control systems to enhance the operations of interoperating unmanned arial drones and windfarms.

BACKGROUND

Unmanned Arial Systems (UAS), the broadly defined category of which is referred to in this description by the commonly used term "drones," are used to support various functions in the operation and maintenance of windfarms. For example, drones are able to be used for rapid and efficient of observation and delivery of maintenance material to the many wind turbines that are deployed within a windfarm. Windfarms in general are able to include a number of wind turbines that are installed over a geographical area. Windfarms in many examples include a large number of wind turbines that occupy a sizable geographic area. Drones are used in various scenarios to efficiently facilitate reaching the sometimes far flung areas of a windfarm to observe and support various maintenance activities. In some examples, drones are able to be used to inspect components of wind turbines, deliver parts or other equipment to wind turbines undergoing manual inspections or repairs, provide other support, or combinations of these.

The Federal Aviation Administration limits drone flight altitude to four hundred feet unless the drone is in the vicinity of a structure such as a wind turbine. However, wind turbines, such as wind turbines within a windfarm, are spaced far apart and their blades have heights that exceed four hundred feet. This configuration of wind turbines can cause wake turbulence at altitudes below four hundred feet, i.e., within the altitude range to which drone flights are generally restricted. Such wake turbulence is also able to extend to higher altitudes as well. The turbulence generated in the wake of operating upwind wind turbines presents a challenge to flying drones within an operating windfarm while maintaining the altitude range permitted by the Federal Aviation Administration. Flying a drone to a destination that is within an operating windfarm may involve modifying the operations of some of the wind turbines in the windfarm to allow the drone to fly to its destination.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide for the integration and interoperation of windfarm control systems and flight control systems for Unmanned Arial Systems (UAS), which are referred to as "drones" in the following discussion. In an example, the below described systems and methods provide an interconnection between the control systems for a windfarm, such as a windfarm's Supervisory Control And Data Acquisition (SCADA) system, and control systems for the drone. In some examples, this interconnection supports communications between these two control systems and allows combining the wind sites SCADA control system and a drone into an interoperating system that is able to facilitate automated support and perform flight planning and execution within an operating windfarm. In some examples, the below described systems and methods allow autonomous operations that utilize one or more drones to perform tasks such as site inspections, delivery of tools or parts to particular wind turbines, other actions, or combinations of these.

The below described systems and methods in an example implements an interoperating control system that allows both the drone control system and the windfarm control system to communicate with each other and react as a drone flight is planned and executed. In an example, the drone and wind turbine control systems are able to operate in a cohesive manner throughout a flight of a drone during the execution phase of a drone mission. In various examples, the operation of particular wind turbines in the windfarm is able to be adjusted to reduce the effect of turbulence on a drone flying through the windfarm. In some examples, the flight path of the drone through the windfarm is able to be additionally or alternatively adjusted in order to efficiently and safely allow the drone to fly through the windfarm while the wind turbines are operating.

In some examples, the interoperation of the windfarm and the drone includes two levels of windfarm control. In a first level of windfarm control, a number of wind turbines are selectively controlled during a portion of the drone flight to either: 1) derate their electrical power output; or 2) to stop their rotation. In the following discussion, derating the output power of a wind turbine refers to controlling the operation of the wind turbine so as to reduce the power produced by the wind turbine without stopping rotation of the wind turbine. In some examples, the first level of windfarm control is able to alternate between derating the output power of a wind turbine and stopping rotation of the wind turbine according to the desired level of wake effect reduction over time. In a second level of windfarm control, one or more of the wind turbines in the windfarm are controlled to steer the respective wake generated by their operations in order to mitigate or reduce the detrimental impact of that wake on other turbines when, for example, another turbine is shut down to accommodate passage of a drone. This second level of control also reduces turbulent air when the drone is near a given turbine to make the flight path of the drone safer and more efficient. In some examples, the flight path of the drone is able to be altered either according to a pre-flight plan that incorporates adjustments to the operation of the windfarm, during the flight to avoid turbulence that is determined to be presently ahead of the drone's present location, or both.

In some examples, the blades of a wind turbine can be paused for inspection shortly before a drone approaches and begins inspection operations, and the turbine can be restarted once the inspection is completed and the drone has moved away from the wind turbine. In some examples, a drone is able to carry and deliver tools, parts, other things, or combinations of these, to an area of the windfarm, such as to a particular wind turbine.

In an example, the below described systems and methods are able to operate a windfarm and at least one drone such that their control systems interact and communicate with one another to facilitate an exchange of data to allow coordination of autonomous landing of a drone on top of a nacelle of a destination wind turbine. In an example, a drone control system is able to receive data associated with the destination wind turbine, such as the present nacelle heading direction and the wind speed and wind direction at the nacelle, as is determined by and sent from the windfarm controller, in order to facilitate proper control of the drone to insure a safe landing, which can be autonomous, semi-autonomous, or manually controlled, atop the nacelle of the destination wind turbine.

Figure 1:
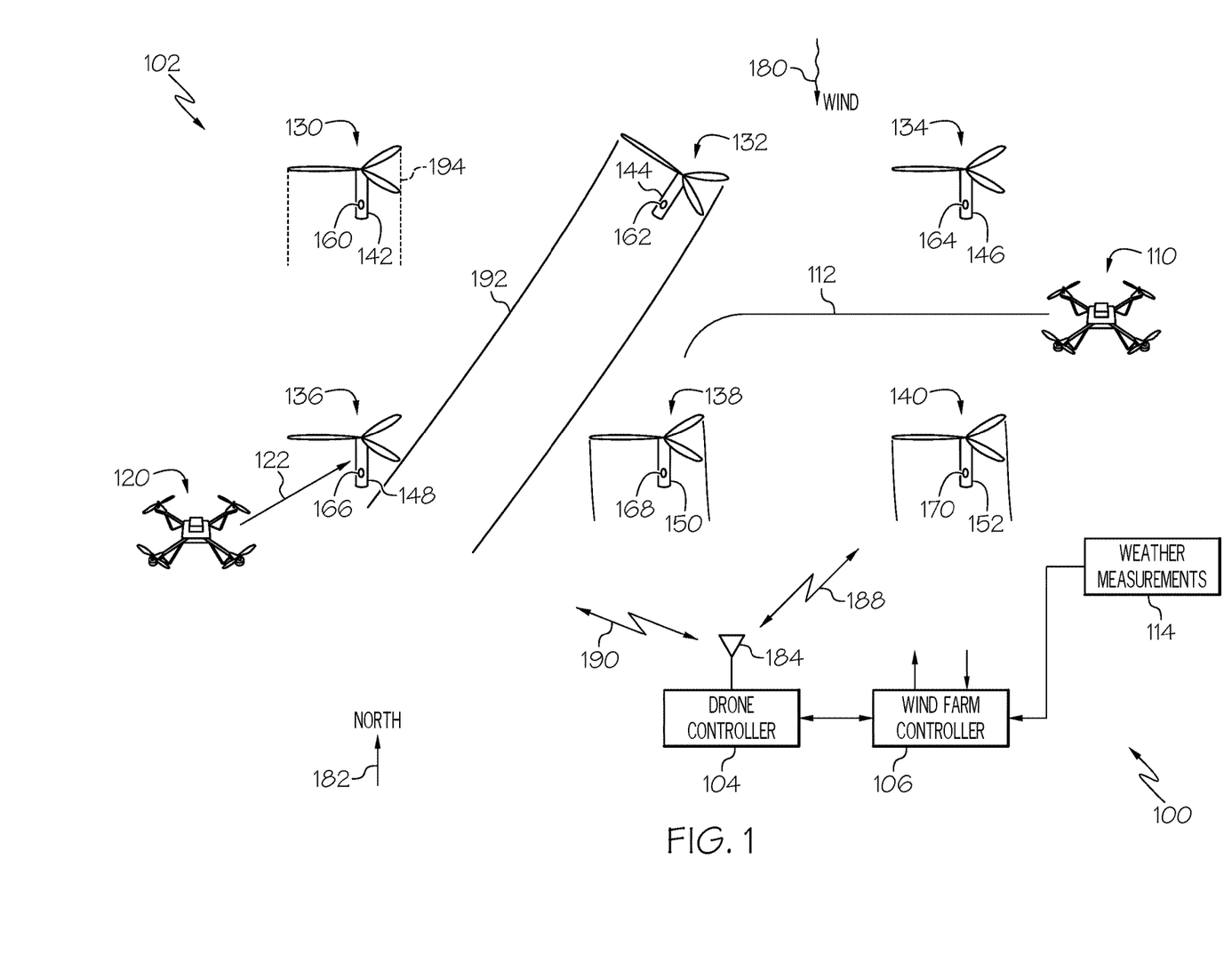
FIG. 1 illustrates an example windfarm drone flight operations scenario, according to an example.

FIG. 1 illustrates an example windfarm drone flight operations scenario 100, according to an example. The example windfarm drone flight operations scenario 100 illustrates an example of a windfarm 102 that is able to operate in conjunction with various drones as is described below to effectively and efficiently allow the drones to fly among the wind turbines of an operating windfarm 102 to arrive at destinations within the windfarm 102. In order to more concisely describe the relevant aspects of the below described systems and methods, a relatively small windfarm 102 is depicted. It is to be understood that the below described systems and methods are able to be effectively and efficiently incorporated into large windfarms with any number of wind turbines that extend over a large geographical area. The following description further focuses on aspects relevant to the operation of the below described systems and methods. It is therefore to be understood that in operating a windfarm or drone, the various components discussed below may also perform other operations that are not described herein.

The example windfarm drone flight operations scenario 100 depicts a portion of a windfarm 102 that has six (6) wind turbines. Each of the illustrated wind turbines has an associated nacelle on which an associated wind monitor is attached. A first wind turbine 130 is shown with a first nacelle 142 on which a first wind monitor 160 is mounted. A second wind turbine 132 is shown with a second nacelle 144 on which a second wind monitor 162 is mounted. A third wind turbine 134 is shown with a third nacelle 146 on which a third wind monitor 164 is mounted. A fourth wind turbine 136 is shown with a fourth nacelle 148 on which a fourth wind monitor 166 is mounted. A fifth wind turbine 138 is shown with a fifth nacelle 150 on which a fifth wind monitor 168 is mounted. A sixth wind turbine 140 is shown with a sixth nacelle 152 on which a sixth wind monitor 170 is mounted.

The nacelle of each illustrated wind turbine house the mechanisms to, for example, generate electricity, steer the wind turbine into a specified heading, perform other control operations, or combinations of these. The wind monitor of each illustrated wind turbine measures various wind conditions, other weather conditions, or combinations of these, in order to support operations of the windfarm 102. In an example, the wind monitors measure wind speed and direction and report those measured quantities to various systems. A north indicator 182 in the diagram indicates a northerly direction for reference of, for example, the orientation of nacelles of the wind turbines and flight paths of various drones.

A weather measurements system 114 in various examples is able to perform various weather measurements, receive weather information from various sources, or both. The weather measurements system 114 in an example measures and reports wind speed and direction at one or more locations on the windfarm 102 in order to support efficient operations of the wind turbines on the windfarm 102.

A windfarm controller 106 in an example controls the operation of the wind turbines in the windfarm 102 and also receives various measured quantities. The windfarm controller 106 in an example receives weather information, including wind speed and wind direction information, from various sources and determined operating parameters for each wind turbine in the windfarm 102. In some examples, the windfarm controller 106 receives wind speed and direction information from one or more of the weather measurements system 114, one or more of the wind monitors on the respective nacelles of the wind turbines in the windfarm 102, other sources, or combinations of these. In an example, the windfarm controller 106 includes a windfarm's Supervisory Control And Data Acquisition (SCADA) system.

Based on the various weather and wind conditions reported by one or more of those various sources, the windfarm controller 106 determines operating parameters such as, but not limited to, the heading of the nacelle of each wind turbine, which is referred to as "yaw," and the pitch of the blades of the wind turbines. In various examples, the windfarm controller 106 determines operating parameters according to various objectives, such as maximizing the electrical output of the windfarm 102 or, as is discussed in further detail below, modifying wake turbulence to accommodate drone flights through the windfarm 102.

A drone controller 104 controls one or more Unmanned Autonomous Systems (UAS), or drones, that are able to fly through the windfarm 102 for various purposes. The example windfarm drone flight operations scenario 100 shows a first drone 108 and a second drone 120. In the illustrated example, the first drone 108 is an observation drone and the second drone 120 is a carrier drone that is configured to carry objects, such as tools, repair parts, other things, or combinations of these, to particular locations in the windfarm 102. In some examples, the drone controller 104 determines a flight path for each drone that is to fly within the windfarm 102.

The drone controller 104, in some examples, further exchanges information with the windfarm controller 106 via a controller interface link 186. In an example, the drone controller 104 communicates the present locations of drones in the windfarm 102, flight paths currently defined for each drone, other information, or combinations of these. The windfarm controller 106 in an example is able respond to that information from the drone controller 104 by altering operating parameters of some or all of the wind turbines in the windfarm 102 to accommodate the present and planned flying locations of various drones. As is described in further detail below, the windfarm controller 106 is able to provide information to the drone controller 104 regarding conditions at particular locations in the windfarm, such as wind speed and direction, nacelle heading for a particular wind turbine along with wind speed and wind direction that is presently observed on that nacelle, or combinations of these.

The first drone 108 is depicted within the windfarm 102 and flying along a first flight path 112. In the illustrated example, the first drone 108 is controlled by the drone controller 104 via a first wireless link 188 through an antenna 184. The first flight path 112 is shown to extend from a present location of the first drone 108, which as shown is to the right of a line between the third wind turbine 134 and the sixth wind turbine 140, to a point in front of the fifth wind turbine 138. As is described in further detail below, drone controller 104 sends indications of the first flight path and the present drone location to the windfarm controller 106, and the windfarm controller is able to, for example, stop the spinning and electrical output of the third wind turbine 134, or derate the electrical output of the third wind turbine 134, and steer the second wind turbine 132 so as to direct its wake 192 away from the first flight path 112. As is shown, the windfarm controller 106 controls the second wind turbine 132 so as to reduce the effect of its wake 192 on other wind turbines of the windfarm, such as on the fourth wind turbine 136 and the fifth wind turbine 138. As shown, the windfarm controller 106 in this example has altered the operational parameters of the second wind turbine 132 to cause its wake 192 to be directed between the fourth wind turbine 136 and the fifth wind turbine 138.

In the illustrated example, the second drone 120 is a carrier drone that is configured to carry a payload to a destination. In some examples, the second drone 120 is able to carry tools, parts, other things, or combinations of these, to locations within the windfarm 102. In the illustrated example, the second drone 120 is controlled by the drone controller 104 via a second wireless link 190 through the antenna 184. In the illustrated example, the second drone 120 is being operated to land on the top of the nacelle of the fourth wind turbine 136. In this example, the drone controller 104 has provided the present location of the second drone 120 and an indication of the second flight path 122 to the windfarm controller 106. The windfarm controller 106, based on the information it has received, has sent commands to the first wind turbine 130 to cause the power output of the first wind turbine 130 to be reduced, which is referred to as "derating" the power output of the first wind turbine 130. By derating the power output of the first wind turbine 130, its wake 194 and the effect of that wake 194 in the area of the fourth wind turbine 136 are reduced so as to better facilitate landing the second drone 120 on the fourth nacelle 148 of the fourth wind turbine 136. The windfarm controller 106 in this example further receives wind measurements, such as wind speed and wind direction, from the fourth wind monitor 166 on the fourth nacelle 148 in order to better coordinate landing of the second drone 120 on the fourth nacelle 148.

Figure 2:
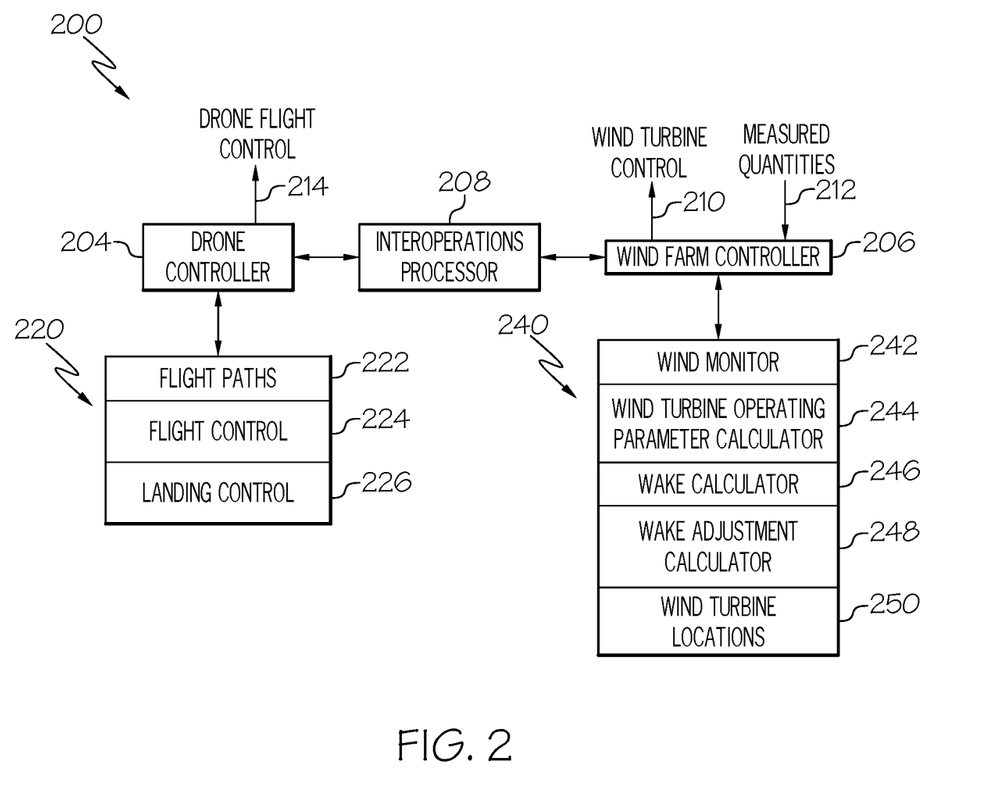
FIG. 2 illustrates an interoperating controller block diagram, according to an example.

FIG. 2 illustrates an interoperating controller block diagram 200, according to an example. The interoperating controller block diagram 200 illustrates an example of interoperations of controllers for a windfarm, such as the above described windfarm 102, and controllers for one or more drones as are discussed above.

The interoperating controller block diagram 200 includes a drone controller 204, which is similar to the above described drone controller 104, and a windfarm controller 206, which is similar to the above described windfarm controller 106. In the illustrated example, an interoperations processor 208 exchanges data with the drone controller 204 and the windfarm controller 206. In some examples, the interoperations processor 208 performs processing to receive information from the drone controller 204, the windfarm controller 206, or both, and then generates data, commands, or both, to send to either or both of the drone controller 204 and the windfarm controller 206 in order to facilitate the flight of drones through an operating windfarm being controlled by the windfarm controller 206.

The drone controller 204 is in communications with a drone controller memory 230. The drone controller memory 230 in an example stores data such as definitions of flight paths 222. The drone controller memory 230 further includes processor executable code such as a flight control program 224 and a landing control program 226. In an example, the drone controller 204 controls the flight of drones, such as the above described first drone 108 and second drone 120, and sends present drone locations and flight path information to the interoperations processor 208. The drone controller 204 receives, in an example, indications of nacelle heading, wind speed, wind direction, other information, or combinations of these from the interoperations processor 208. In some examples, the drone controller 204 receives data, commands, or combinations of these, from the interoperations processor 208 to, for example, cause the drone controller 204 to alter flight paths in order to avoid turbulence from wakes being generated by wind turbines being controlled by the windfarm controller 206.

The windfarm controller 206 is in communications with a windfarm controller memory 240. The windfarm controller memory 240 in an example stores data such as wind turbine location storage 250. The windfarm controller memory 240 also stores processor executable code such as a wind monitor program 242, wind turbine operating parameter calculator 244, wake calculator 246 and a wake adjustment calculator 248. The wind monitor program 242 monitors wind in the windfarm, such as is reported by wind monitors on the wind turbines or the weather measurements system 114. The wind turbine operating parameter calculator 244 operates to determine operating parameters to configure each wind turbine in the windfarm given desired operation conditions for each wind turbine. The wake adjustment calculator 248 determines adjustments to operating parameters for one or more wind turbines to adjust the direction, magnitude, other aspects, or combinations of these, of wake generated by one or more wind turbines in the windfarm.

The windfarm controller 206 in some examples sends indications of wake locations, wind speed, wind headings, other information, or combinations of these, to the interoperations processor 208. The windfarm controller 206 in some examples receives commands or indications of, for example, drone flight paths, present drone locations, other information, or combinations of these, from the interoperations processor 208 in order to implement changes to operational parameters for one or more wind turbines to reduce the effect of wakes on the flight of drones through the windfarm being controlled by the windfarm controller 206.

The interoperations processor 208 in an example is able to receive information from the drone controller 204 and the windfarm controller 206 and perform processing to create data, commands, other information, or combinations of these to exchange with the drone controller 204 and the windfarm controller 206 to facilitate the efficient and effective interoperation of drone flights through an operating windfarm. Such processing in an example is performed by executing computer executable programs with processors in the interoperations processor 208. In an example, an interoperations processor 208 is able to be designed to operate with an unmodified or lightly modified windfarm controller 206, drone controller 204, or both, in order to access data from both of those controllers and provide commands, data, other information, or combinations of these, to both of those controllers in order to allow drones controlled by the drone controller 204 to fly through a windfarm controlled by the windfarm controller 206. In some examples, one or both of the drone controller 204 or the windfarm controller 206 are able to be modified to facilitate interaction with the other controller and thus include some or all of the processing incorporated in the interoperations processor 208. In an example, where one or both of the drone controller 204 and the windfarm controller 206 is or are modified to support such interoperations, the drone controller 204 and the windfarm controller 206 are able to communicate via a data communications link or other technique without an intervening processor to perform the intermediate processing of the interoperations processor 208.

Figure 3:
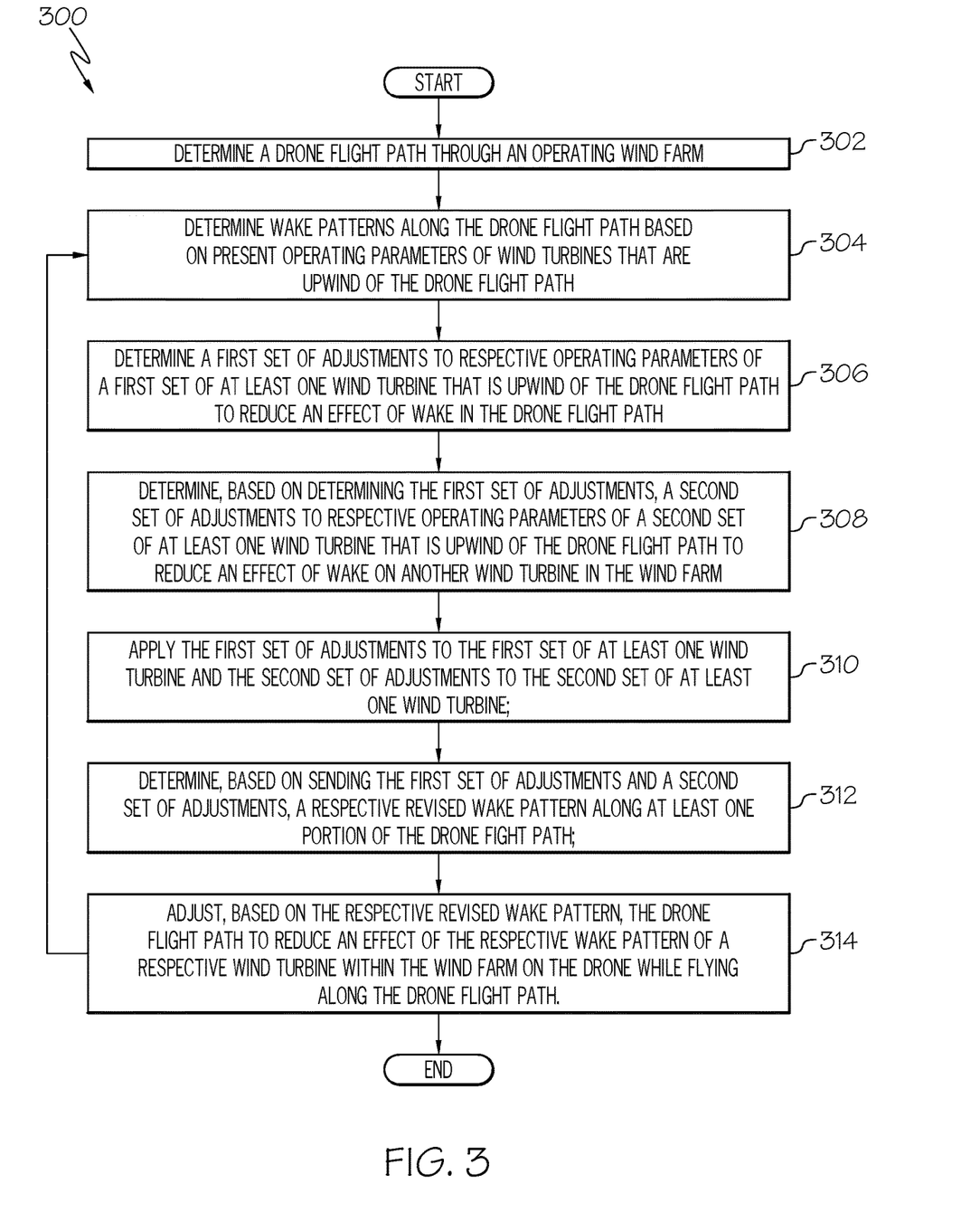
FIG. 3 illustrates a drone flight coordination process, according to an example.

FIG. 3 illustrates a drone flight coordination process 300, according to an example. The drone flight coordination process 300 is an example of a process performed by one or more of the processors described above with regards to the interoperating controller block diagram 200. The drone flight coordination process 300 is an example of a process that facilitates the efficient interoperation of drones flying through an operating windfarm.

The drone flight coordination process 300 determines, at 302, a drone flight path through an operating windfarm. In various examples, the drone flight path is able to be determined by any suitable technique based upon a present location of the drone to fly along that path and the desired destination for that drone. In some examples, the drone flight path that extends through at least part of a windfarm to a destination location is determined, refined, re-defined, or combinations of these at various times as the drone flies along a previously determined flight path. A drone flight path is able to be determined by any device, such as a drone controller, another device that is used to support service or maintenance of a windfarm, other devices, or combinations of these. In an example, the drone flight path is removed from any location where the drone is conducting observations of a wind turbine, such as a location where the drone is stationary or moving to capture images, videos, perform other observations or measurements, or combinations of these. The drone flight path in such an example is a portion of a flight path where the drone is moving through the windfarm on its way to a destination where the drone will conduct observations of a wind turbine or land.

Wake patterns along the drone flight path are determined, at 304, based on present operating parameters of wind turbines that are upwind of the drone flight path. In various examples, wake patterns are determined along the drone flight path, which had been determined above, based on any suitable technique. In some examples, wake patterns are determined in conjunction with modelling of wake effects created by wind turbines based upon wind turbine operational parameters, such as output power as set by blade pitch and nacelle heading relative to the present wind direction, and also based on weather conditions at the windfarm, such as present or predicted wind speed and direction, other atmospheric data, or any combinations of these, along with relative wind turbine locations. In an example, a computer model to estimate or predict wake effects is included in a windfarm controller such as the above described wake calculator 246 that is executed by the windfarm controller 206. Wake patterns in some examples are also based upon wind turbine locations such as are stored in the wind turbine locations storage 250 discussed above. In some examples, wake patterns are determined based on measured wind data, weather data, or both, that is reported by, for example, measurement devices within or near the windfarm, such as the wind monitors on each wind turbine, based on weather data reported by various meteorological services, based on data from any source, or combinations of these.

A first set of adjustments to respective operating parameters of a first set of at least one wind turbine that is upwind of the drone flight path are determined, at 306, to reduce an effect of wake in the drone flight path. In an example, the first set of adjustments to respective operating parameters includes adjustments to, for example, wind turbine blade pitch, nacelle heading relative to the present wind direction, other operating parameters, or combinations of these. The first set of adjustments is able to include, for example, shutting down one or more wind turbines so as to stop rotation of the one or more wind turbines, derating the output power of one or more wind turbines, i.e., reducing the output power produced by each of the one or more wind turbines without causing the one or more wind turbines to stop rotation, altering the angle of one or more wind turbines relative to the present wind direction, other alteration of wind turbine operations, or combinations of these. In an example, this first set of adjustments is determined by using a computer model of wakes created by wind turbines given various values of operational parameters of those wind turbines to evaluate wake effects along the drone flight path as the operational parameters of at least one wind turbine is varied. In an example, such a computer model is able to be iterated until the wake along the drone flight path has been reduced to below a desired level.

In an example, the first set of adjustments is determined to reduce the effect of wake in portions of the drone flight path that are ahead of the drone's present position. In some examples, a sequence of adjustments is determined to adjust the wake at different points along the drone flight path as the drone advances along the path. Such a sequence is able to be determined during iterations of the drone flight coordination process 300. In various examples, such iterations are able to be performed as the drone proceeds along the drone flight path, precalculated prior to the flight, or a combination of these.

A second set of adjustments to respective operating parameters of a second set of at least one wind turbine that is upwind of the drone flight path are determined, at 308 based on determining the first set of adjustments, to reduce an effect of wake on another wind turbine in the windfarm. In an example, the second set of adjustments are determined as adjustments to make to the values of the operational parameters of the second set of at least one wind turbine after an adjustment of those operational parameters by the first set of adjustments. In an example, mathematical models are able to evaluate the wake created along the drone flight path using the values of operational parameters after the first set of adjustments would have been applied, and then further vary those operational parameters to reduce the effect of want on another wind turbine.

In an example, the computer model to determine wakes created by turbines, such as the wake calculator 246 executed by the windfarm controller 206, is used to evaluate the effect of the wakes created by wind turbines operating with the first set of operational parameters on other wind turbines in the windfarm. In an example, the first set of adjustments and the second set of adjustments are determined based on wind turbine operating parameters determined by the wind turbine operating parameter calculator 244 operating in conjunction with the above described wake adjustment calculator 248. In order to maintain operations of the windfarm, the operating parameters of the wind turbines in the windfarm are further adjusted to reduce the effect of wakes on other wind turbines that might have been created by the first set of adjustments. In an example, candidate values for the second set of adjustments are used with the computer model to evaluate, based on the outputs of the computer model, the effect of wakes generated by wind turbines on other wind turbines in the windfarm. In an example, the computer model is iteratively executed with various operational parameters and the effect of wake on other wind turbines in the windfarm is evaluated until the wake effect on other wind turbines is reduced to below a desired level. As discussed above with regards to the first set of adjustments, the second set of adjustments in some examples is able to include, for example, shutting down one or more wind turbines so as to stop rotation of the one or more wind turbines, derating the output power of one or more wind turbines, i.e., reducing the output power produced by each of the one or more wind turbines without causing the one or more wind turbines to stop rotation, altering the angle of one or more wind turbines relative to the present wind direction, other alteration of wind turbine operations, or combinations of these.

In an example, the determination of the second set of adjustments also evaluates the effect of wakes generated by wind turbines operating with the second set of adjustments on both the drone flight path and on other wind turbines in the windfarm. In such an example, the second set of adjustments are adjustments to be applied to the first set of adjustments and are operating parameters for at least one wind turbine to reduce the effect of wakes on both the drone flight path and other wind turbines to below a desired level. In an example, determining such adjustments is an example of determining at least one respective adjusted operating parameter of the respective wind turbine, the at least one respective adjusted operating parameter causing a reduced effect of wake generated by the respective wind turbine on the point ahead of the drone and also on other wind turbines in the windfarm, and where the at least one adjusted operating parameter is at least part of the first set of adjustments, the second set of adjustments, or both.

In some examples, the drone flight path and other wind turbines have different wake effect levels that are tolerable and below which the level of wake effects predicted by the computer model is to be reduced. In an example, the second set of adjustments includes determining operating parameters for wind turbines in the windfarm that reduce the wake effects on the drone flight path and also the wake effects on other wind turbines to below their respective tolerable levels.

At 310, the first set of adjustments are applied to the first set of at least one wind turbine and the second set of adjustments are applied to the second set of at least one wind turbine. In an example, a windfarm controller, such as the above described windfarm controller 106, configures the wind turbines with the operational parameters having these adjusted values. Determining and applying the first set of adjustments is an example of sending, by a windfarm controller controlling the at least one wind turbine, flight time commands to adjust at least one respective operating parameter of the respective wind turbine to reduce the effect of the respective wake pattern at a point ahead of the drone on the drone flight path. Such commands are referred to as flight time commands because they are sent during the time the drone is flying.

A respective revised wake pattern along at least one portion of the drone fight path is determined, at 312, based on sending the first set of adjustments and a second set of adjustments. The revised wake pattern along at least one portion of the drone flight path in an example is determined by the above described computer model by applying the first set of adjustments and the second set of adjustments to the operational parameters of the wind turbines in the windfarm and recalculating the wake pattern along at least one portion of the drone flight path. In an example, the revised wake pattern may be determined based in part on updated environmental data such as wind direction, wind speed, other parameters, or combinations of these, and reflects wake patterns after the first set of adjustments and the second set of adjustments are applied. This determining a respective revised wake pattern is an example of determining, based on sending the flight time commands, a respective revised wake pattern along at least one portion of the drone fight path.

The drone flight path is adjusted, at 314, based on the respective revised wake pattern, to reduce an effect of the respective wake pattern of a respective wind turbine within the windfarm on the drone while flying along the drone flight path. This adjustment is an example of adjusting, at a drone flight controller based on the respective revised wake pattern, the drone flight path to reduce an effect of the respective wake pattern of a respective wind turbine within the windfarm on the drone while flying along the drone flight path. In an example, the drone flight pattern is able to be adjusted to avoid areas of wake that are above a determined threshold. Such an adjustment to the drone flight path is able to be made automatically by a suitable processor, such as one or both of the above described interoperations processor 208 or the drone controller 214.

The drone flight coordination process 300 then returns to determining, at 304, wake patterns along the drone flight path and reiterates through the above described processing. In an example, iteration of the drone flight coordination process 300 over a time duration causes sending, over a duration of time, a plurality of commands from the drone flight controller to the windfarm controller to reduce the effect of the respective wake pattern at locations ahead of the drone as the drone proceeds along the drone flight path.

Figure 4:
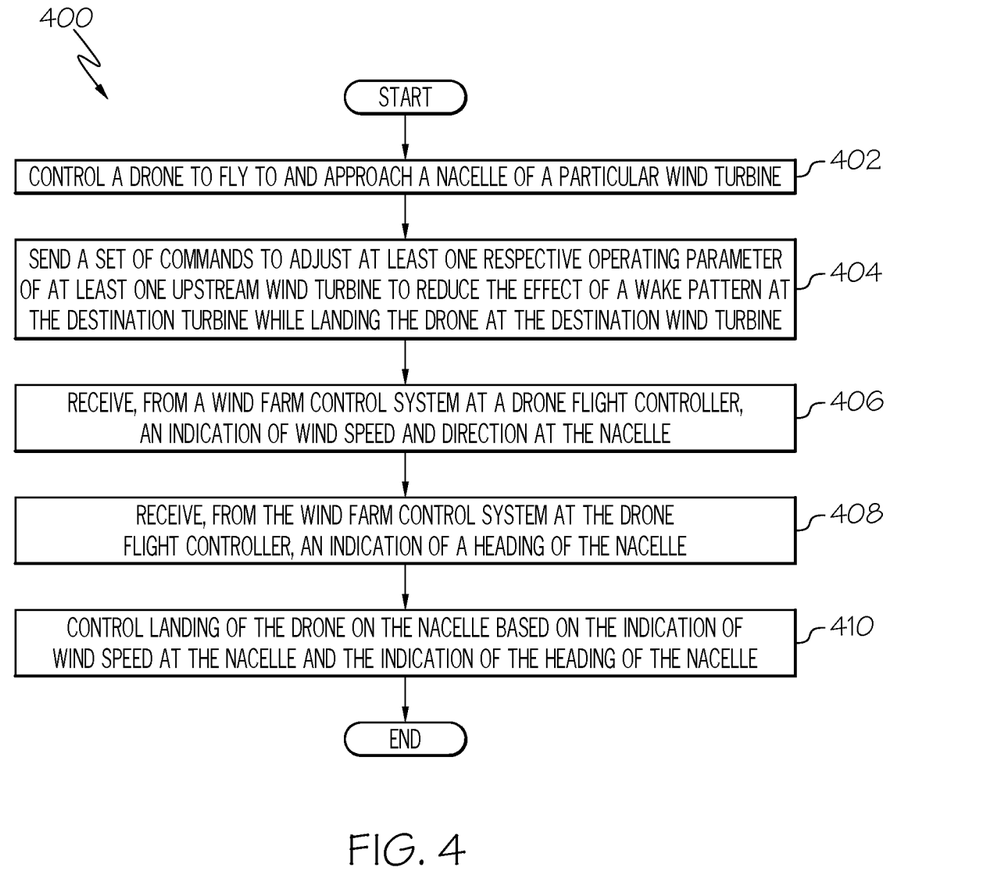
FIG. 4 illustrates a drone landing coordination process, according to an example.

FIG. 4 illustrates a drone landing coordination process 400, according to an example. The drone landing coordination process 400 is an example of a process performed by one or more of the processors described above with regards to the interoperating controller block diagram 200. In an example, the drone landing coordination process 400 is able to be performed by the above described drone controller 204, or by processing that is distributed across the drone controller 204 and the interoperations processor 208.

The drone landing coordination process 400 is an example of a process that facilitates the efficient interoperation of drones flying through an operating windfarm and landing such drones at locations within the windfarm, such as on top of a nacelle of a wind turbine. In an example, the drone landing coordination process operates with a drone where the drone carries material to be delivered to the destination wind turbine. The drone landing coordination process 400 in an example works in conjunction with the above described drone flight coordination process 300, where the drone flight path has a destination that is a destination wind turbine. For example, the drone flight coordination process 300 is able to operate to bring a drone into the vicinity of a particular wind turbine and the drone landing coordination process 400 operates to land that drone on that particular wind turbine.

The drone landing coordination process 400 controls, at 402, a drone to fly to and approach a nacelle of a particular wind turbine. In an example, controlling a drone to fly to and approach a nacelle includes processing such as is described above with regards to the drone flight coordination process 300.

A set of commands to adjust at least one respective operating parameter of at least one upwind wind turbine to reduce the effect of a wake pattern created by the at least one upwind wind turbine at the destination wind turbine while landing the drone at the destination wind turbine is sent, at 404, to control at least upwind one wind turbine that is upwind of the destination wind turbine. In an example, the second set of commands is determined by the wake adjustment calculator 248 described above to determine commands that reduce wake at the destination wind turbine and are sent to a windfarm controller. In an example, the set of commands are determined so as to reduce the effect of the wake pattern at the nacelle of the destination wind turbine.

An indication of wind speed and direction at the nacelle is received, at 406, from a windfarm control system at a drone flight controller. In an example, wind speed and direction at the nacelle is measured and reported by the weather monitor, such as the fourth wind monitor 166 described above, to the windfarm controller 106, and the windfarm controller 106 provides the wind speed and direction information to the drone controller 104. In an example, this information is received after sending the second set of commands.

An indication of a heading of the nacelle is received, at 408, from the windfarm control system at the drone flight controller. In an example, the windfarm controller 106 monitors the heading of the nacelles of all wind turbines in the windfarm, and the windfarm controller 106 provides an indication of the heading of the destination nacelle to the drone controller 104.

Landing of the drone on the nacelle is controlled, at 410, based on the indication of wind speed at the nacelle and the indication of the heading of the nacelle. In an example, the drone controller 104 receives the wind speed and direction at the nacelle and also the heading of the nacelle, and incorporates that information into the control of the drone when landing the drone on the nacelle. The drone landing coordination process 400 then ends.

Figure 5:
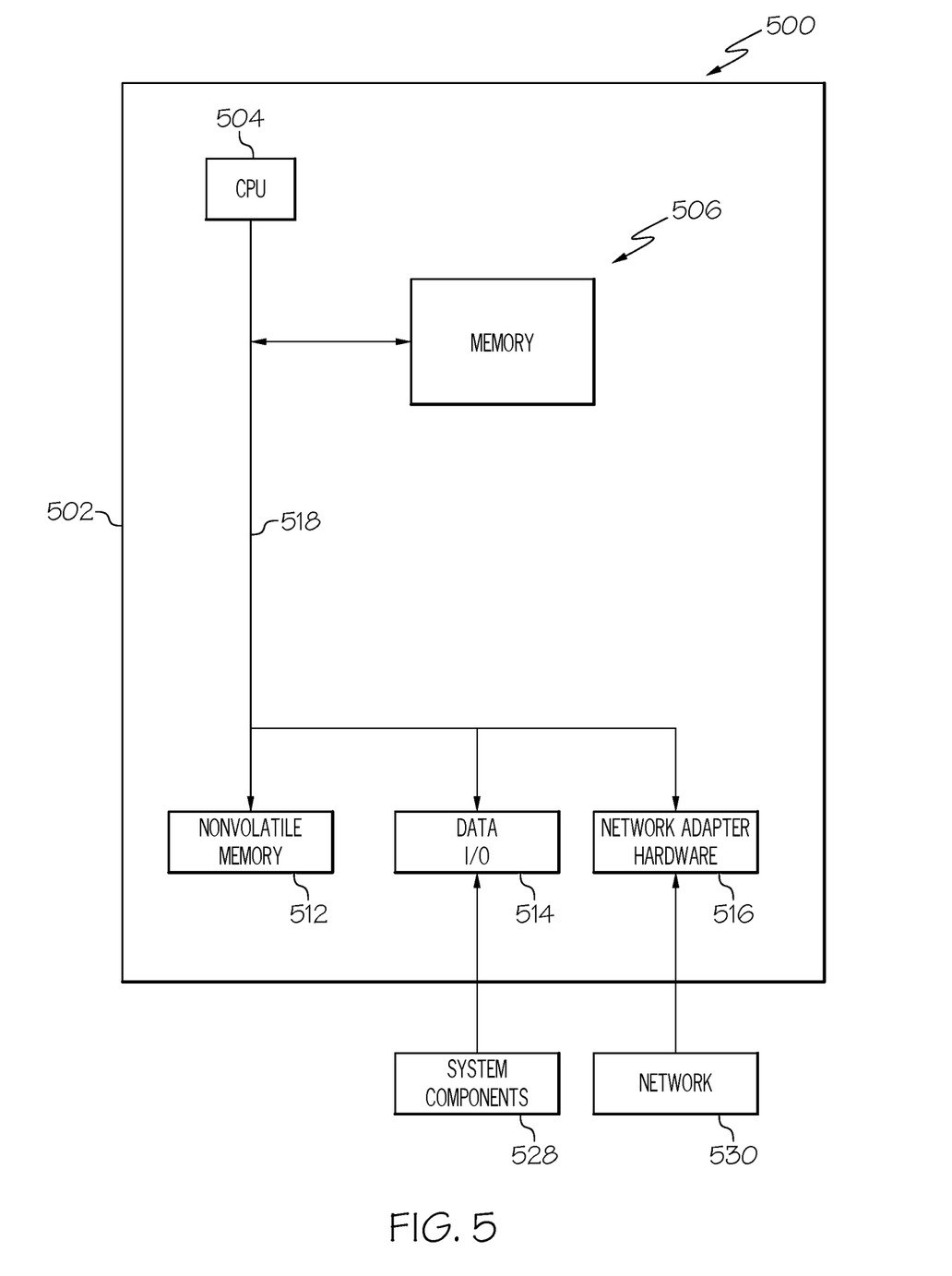
FIG. 5 illustrates a block diagram illustrating a controller, according to an example.

FIG. 5 illustrates a block diagram illustrating a controller 500 according to an example. The controller 500 is an example of a processing subsystem that is able to perform any of the above described processing operations, control operations, other operations, or combinations of these.

The controller 500 in this example includes a CPU 504 that is communicatively connected to a main memory 506 (e.g., volatile memory), a non-volatile memory 512 to support processing operations. The CPU is further communicatively coupled to a network adapter hardware 516 to support input and output communications with external computing systems such as through the illustrated network 530.

The controller 500 further includes a data input/output (I/O) processor 514 that is able to be adapted to communicate with any type of equipment, such as the illustrated system components 528. The data input/output (I/O) processor in various examples is able to be configured to support any type of data communications connections including present day analog and/or digital techniques or via a future communications mechanism. A system bus 518 interconnects these system components.

In other examples, yaw offset may be based not only on wind direction, but also air temperature, air humidity and other atmospheric affects.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for coordinating drone flights in an operating windfarm, the method comprising:
   determining, for a drone, a portion of a drone flight path that extends through at least part of a windfarm between wind turbines to a destination location, the portion of the drone flight path being removed from any location where the drone is conducting inspection of any wind turbine;
   determining, based on respective operating parameters for each of at least one wind turbine in the windfarm, a respective wake pattern created by a plurality of wind turbines in the windfarm along the portion of the drone fight path through the windfarm that is removed from any location where the drone is conducting inspection of any wind turbine;
   determining a revised wake pattern along the portion of the drone fight path to reduce an effect of the respective wake pattern at a point ahead of the drone on the portion of the drone flight path that is removed from any location where the drone is conducting inspection of any wind turbine, wherein the revised wake pattern results from a planned adjustment of at least one respective operating parameter of at least one wind turbine in the windfarm; and
   performing the planned adjustment, based on determining the revised wake pattern by sending flight time commands from a windfarm controller controlling the at least one wind turbine, on the at least one respective operating parameter of the at least one wind turbine to reduce an effect of the respective wake pattern at a point ahead of the drone on the portion of the drone flight path that is removed from any location where the drone is conducting inspection of any wind turbine.

2. The method of claim 1, where adjusting the at least one respective operating parameter of the at least one wind turbine to reduce the effect of the respective wake pattern at a point ahead of the drone on the portion of the drone flight path further comprises sending additional flight time commands to reduce the effect of the respective wake pattern of at least one wind turbine in the windfarm.

3. The method of claim 1, further comprising:
   adjusting, at a drone flight controller based on the revised wake pattern, the portion of the drone flight path to reduce an effect of the revised wake pattern of a respective wind turbine within the windfarm on the drone while flying along the portion of the drone flight path.

4. The method of claim 1, where sending the flight time commands comprises sending, over a duration of time, a plurality of commands from a drone flight controller to the windfarm controller to reduce the effect of the respective wake pattern at locations ahead of the drone as the drone proceeds along the portion of the drone flight path.

5. The method of claim 1, further comprising:
   determining, subsequent to and based on sending flight time commands to adjust at least one respective operating parameter of the at least one wind turbine, a second revised wake pattern along the portion of the drone fight path wherein the second revised wake pattern results from an adjustment of at least one respective operating parameter of at least one wind turbine in the windfarm;
   sending, by the windfarm controller controlling the at least one wind turbine based on the second revised wake pattern, flight time commands to adjust at least one operating parameter of the at least one wind turbine to reduce an effect of the second revised wake pattern at a point ahead of the drone on the portion of the drone flight path that is removed from any location where the drone is conducting inspection of any wind turbine; and
   adjusting, at a drone flight controller based on the second revised wake pattern, the portion of the drone flight path to reduce an effect of the second revised wake pattern of a respective wind turbine within the windfarm on the drone while flying along the portion of the drone flight path.

6. The method of claim 1, where the flight time commands comprise at least one of commands to cause the at least one wind turbine to derate an output power of a wind turbine or adjust operating parameters to change a direction of wake generated by the wind turbine.

7. The method of claim 1, further comprising determining at least one respective adjusted operating parameter of a wind turbine, the at least one respective adjusted operating parameter causing a reduced effect of wake generated by the wind turbine on the point ahead of the drone and also on other wind turbines in the windfarm, and
   where the flight time commands comprise commands to apply the at least one adjusted operating parameter.

8. The method of claim 1, where the destination location comprises a destination wind turbine in the windfarm,
   where the drone carries material to be delivered to the destination wind turbine, and
   where the method further comprising:
      sending a second set of commands to adjust at least one respective operating parameter of at least one upwind wind turbine to reduce the effect of a wake pattern created by the at least one upwind wind turbine at the destination wind turbine while landing the drone at the destination wind turbine;
      receiving, at a drone flight controller after sending the second set of commands, received present wind condition information at the destination wind turbine; and
      controlling, with the drone flight controller, the drone to land at the destination wind turbine based on the received present wind condition information.

9. The method of claim 8, where controlling the drone to land comprises controlling the drone to land on a nacelle of the destination wind turbine, and
   where the second set of commands reduces the effect of the wake pattern at the nacelle of the destination wind turbine.

10. An apparatus for coordinating drone flights in an operating windfarm, the apparatus comprising:
   a processor;
   a memory in communications with the processor;

a drone controller that, when operating, is configured to determine, for a drone, a portion of a drone flight path that extends through at least part of a windfarm to a destination location, the portion of the drone flight path being removed from any location where the drone is conducting inspection of any wind turbine; and a windfarm controller that, when operating, is configured to:

determine, based on respective operating parameters for each of at least one wind turbine in the windfarm, a respective wake pattern created by a plurality of wind turbines in the windfarm along the portion of the drone fight path through the windfarm that is removed from any location where the drone is conducting inspection of any wind turbine;

determine a revised wake pattern along the portion of the drone fight path to reduce an effect of the respective wake pattern at a point ahead of the drone on the portion of the drone flight path that is removed from any location where the drone is conducting inspection of any wind turbine, wherein the revised wake pattern results from a planned adjustment of at least one respective operating parameter of at least one wind turbine in the windfarm; and perform the planned adjustment, based on the revised wake pattern by sending flight time commands from a windfarm controller controlling the at least one wind turbine, on the at least one respective operating parameter of the at least one wind turbine to reduce an effect of the respective wake pattern at a point ahead of the drone on the portion of the drone flight path that is removed from any location where the drone is conducting inspection of any wind turbine.

11. The apparatus of claim 10, where the windfarm controller is configured to send flight time commands to adjust at least one respective operating parameter of the at least one wind turbine to reduce the effect of the respective wake pattern at a point ahead of the drone on the portion of the drone flight path by at least sending additional flight time commands to reduce the effect of the respective wake pattern of at least one wind turbine in the windfarm.

12. The apparatus of claim 10, where the drone controller, when operating, is further configured to adjust, based on the revised wake pattern, the portion of the drone flight path to reduce an effect of the revised wake pattern of a respective wind turbine within the windfarm on the drone while flying along the portion of the drone flight path.

13. The apparatus of claim 10, where the windfarm controller, when operating, is further configured to send the flight time commands by at least sending, over a duration of time, a plurality of commands from a drone flight controller to the windfarm controller to reduce the effect of the respective wake pattern at locations ahead of the drone as the drone proceeds along the portion of the drone flight path.

14. The apparatus of claim 10, where the windfarm controller, when operating, is further configured to:

determine, subsequent to and based on sending flight time commands to adjust at least one respective operating parameter of the at least one wind turbine, a second revised wake pattern along the portion of the drone fight path wherein the second revised wake pattern results from an adjustment of at least one respective operating parameter of at least one wind turbine in the windfarm; and send, based on the second revised wake pattern, flight time commands to adjust at least one respective operating parameter of the at least one wind turbine to reduce an effect of the second revised wake pattern at a point ahead of the drone on the portion of the drone flight path that is removed from any location where the drone is conducting inspection of any wind turbine, and where the drone controller, when operating, is further configured to adjust, based on the second revised wake pattern, the portion of the drone flight path to reduce an effect of the second revised wake pattern of a respective wind turbine within the windfarm on the drone while flying along the portion of the drone flight path.

15. The apparatus of claim 10, where the flight time commands comprise at least one of commands to cause the at least one wind turbine to derate an output power of a wind turbine.

16. The apparatus of claim 10, where the flight time commands comprise commands to stop rotation of a wind turbine.

17. The apparatus of claim 10, where the flight time commands cause a wind turbine to adjust operating parameters to change a direction of wake generated by the wind turbine.

18. The apparatus of claim 10, where the windfarm controller, when operating, is further configured to determine at least one respective adjusted operating parameter of a wind turbine, the at least one respective adjusted operating parameter causing a reduced effect of wake generated by the wind turbine on the point ahead of the drone and also on other wind turbines in the windfarm, and where the flight time commands comprise commands to apply the at least one adjusted operating parameter.

19. The apparatus of claim 10, where the destination location comprises a destination wind turbine in the windfarm, where the drone carries material to be delivered to the destination wind turbine, and where the drone controller, when operating, is further configured to:

send, to the windfarm controller, a second set of commands to adjust at least one respective operating parameter of at least one upwind wind turbine to reduce the effect of a wake pattern created by the at least one upwind wind turbine at the nacelle of the destination wind turbine while landing the drone at the destination wind turbine;

receive, after sending the second set of commands, received present wind condition information at the destination wind turbine; and control the drone to land at the destination wind turbine based on the received present wind condition information by at least controlling the drone to land on a nacelle of the destination wind turbine.

20. A computer program product for coordinating drone flights in an operating windfarm, the computer program product comprising:

a computer readable storage medium having computer readable program code embodied therewith, the computer readable program code comprising instructions for:

determining, for a drone, a portion of a drone flight path that extends through at least part of a windfarm between wind turbines to a destination location, the portion of the drone flight path being removed from any location where the drone is conducting inspection of any wind turbine;

determining, based on respective operating parameters for each of at least one wind turbine in the windfarm, a respective wake pattern created by a plurality of wind turbines in the windfarm along the portion of the drone fight path through the windfarm that is removed from any location where the drone is conducting inspection of any wind turbine;

determining a revised wake pattern along the portion of the drone fight path to reduce an effect of the respective wake pattern at a point ahead of the drone on the portion of the drone flight path that is removed from any location where the drone is conducting inspection of any wind turbine, wherein the revised wake pattern results from a planned adjustment of at least one respective operating parameter of at least one wind turbine in the windfarm; and performing the planned adjustment, based on the revised wake pattern by sending flight time commands from a windfarm controller controlling the at least one wind turbine, the at least one respective operating parameter of the at least one wind turbine to reduce an effect of the respective wake pattern at a point ahead of the drone on the portion of the drone flight path that is removed from any location where the drone is conducting inspection of any wind turbine.

\* \* \* \* \*